United States Patent [19]

Kawai

[11] Patent Number: 5,717,721
[45] Date of Patent: Feb. 10, 1998

[54] DEMODULATION CORRECTING CIRCUIT FOR FSK RECEIVER

[75] Inventor: Kazuo Kawai, Yokohama, Japan

[73] Assignee: General Research of Electronics, Inc., Tokyo, Japan

[21] Appl. No.: 517,249

[22] Filed: Aug. 21, 1995

[51] Int. Cl.$^6$ .................................................. H04L 27/14
[52] U.S. Cl. .................... 375/326; 375/327; 375/344; 329/302; 455/192.2; 455/264
[58] Field of Search ................................. 375/334, 335, 375/344, 324, 327, 326, 328; 329/302, 306, 307, 300; 455/192.2, 255, 257, 192.1, 264

[56] References Cited

U.S. PATENT DOCUMENTS

| | | | |
|---|---|---|---|
| 3,936,753 | 2/1976 | Clark | 455/192.2 |
| 4,152,650 | 5/1979 | Bennett, Jr. | 455/257 |
| 4,518,922 | 5/1985 | Luecke | 375/334 |
| 4,827,488 | 5/1989 | Shibano | 375/328 |
| 5,081,652 | 1/1992 | Farahati et al. | 375/344 |
| 5,530,723 | 6/1996 | Maplestone | 375/344 |

*Primary Examiner*—Stephen Chin
*Assistant Examiner*—Don Vo
*Attorney, Agent, or Firm*—Trexler, Bushnell, Giangiorgi & Blackstone, Ltd.

[57] ABSTRACT

A demodulation correcting circuit for an FSK signal receiver which include an AFC for correcting a reception frequency error to provide stabilized demodulation, said demodulation correcting circuit comprising subtracting circuit followed to a loop filter for eliminating or correcting a variation of the center frequency of the FSK modulation signal, which is caused by the fact that the AFC responds to low frequency components including DC of the FSK modulation signal and which brings about a decrease of noise margin.

2 Claims, 6 Drawing Sheets

DEMODULATION CORRECTING CIRCUIT FOR FSK RECEIVER

BACKGROUND OF THE INVENTION

The present invention relates generally to a technique for stabilizing demodulating operation of a frequency shift keying (FSK) signal receiver. The FSK system transmits data with frequency shift of a carrier signal. In the FSK, information of the data depends on the carrier frequency.

In general, the FSK receiver includes an automatic frequency control (AFC) circuit for correcting any frequency error in the signal received by the receiver. This AFC circuit can operate without influence by the modulation codes of the FSK signal only when they are balanced with respect to the DC component as Manchester codes or the modulating signal is scrambled because the DC component is zero and also lower frequency components are close to zero. However, in cases where modulation codes are other than the above, the moving average value of the modulation codes is changed in accordance with the contents of the codes, and accordingly the AFC changes, too. In consequence, noise margin is decreased and bit error rate is deteriorated.

Accordingly, although it is desirable to use the above-mentioned zero-balanced codes as the modulation codes, when it is impossible, a special technique is needed. For this end, one prior art has been developed in which the codes are arranged into a packet format with a carrier synchronization signal (center frequency) of the header portion of each packet or a following bit synchronization signal (alternate repetition of "1" and "0") used to operate AFC so that the AFC operation is hold until the completion of that packet as it is. However, this method needs means for providing a packet-formatted signal, means for providing a holding characteristic by which the AFC operation is sufficiently held by the length of the packet, and circuit means for recognizing and detecting the carrier synchronization signal or the bit synchronization signal.

SUMMARY OF THE INVENTION

The main object of this invention is to provide a demodulation correcting circuit for an FSK signal by a very simple means. The circuit of this invention can use ordinary NRZ (non-return-to-zero) codes just as they are, of which DC component varies momentarily, and does not need the packet code format and the circuit for recognizing and detecting the carrier and bit synchronization signals as well as the hold circuit, which are indispensable in the prior art system.

In accordance with the present invention, an automatic frequency control (AFC) circuit for correcting a frequency error at the demodulation input of the FSK receiver has a subtracting circuit followed to a loop filter (comprising usually a low-pass filter) coupled between a frequency discriminator and a voltage controlled oscillator, and an equivalent circuitry which may be the same as the loop filter or which has the same transfer function as that of the loop filter, said equivalent circuitry being coupled to the shaped output of the demodulated signal and detecting low frequency components including DC which vary according to the contents of the modulation codes, whereby a variation of the control system depending upon the contents of the modulation codes is eliminated. Alternately, results of the subtraction of the shaped output signal from the frequency discriminator output signal is applied to the loop filter to obtain a control voltage free from the influence by the contents of the modulation codes.

Even though the AFC varies according to the low frequency components including DC of the modulation codes, the modulation codes can be almost reproduced at the output of the "1", "0" decision circuit (although a code distortion based on the variation of the AFC is included). Therefore, By using a low-pass filter of which characteristics are equivalent to those of the loop filter and which is coupled to the "1", "0" decision circuit output, it is possible to eliminate the variation of the AFC. Further, this method is expanded by subtracting the shaping circuit output signal from the frequency discriminator output and then by smoothing the subtracted output by the loop filter, so that the control voltage for the frequency controlling which is unrelated to the modulation code contents can be obtained.

Other features and advantages of the present invention will become more apparent from the following detailed description of the invention, taken in conjunction with the accompanying drawings which illustrate, by way of example, the principles of the invention.

DETAILED DESCRIPTION

Figure 2:
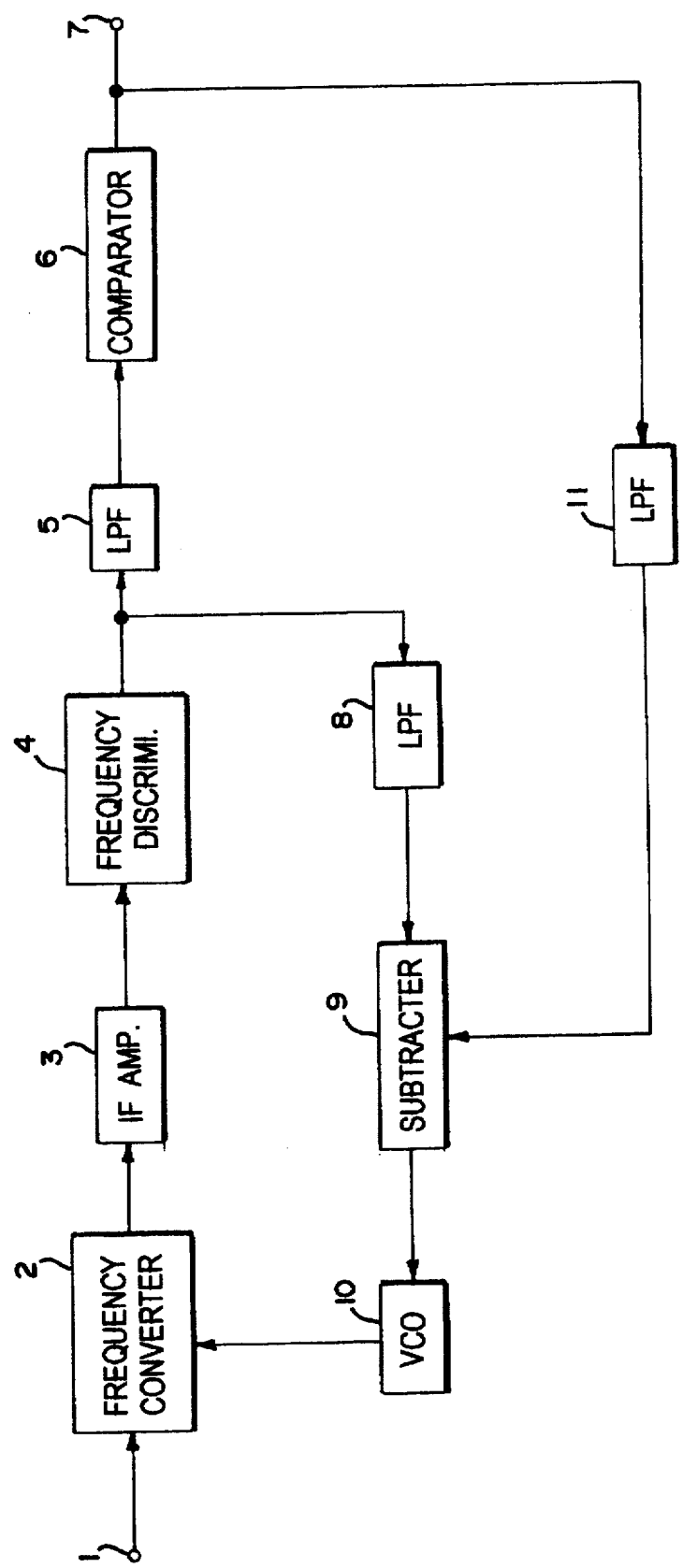
FIG. 2 is a circuit block diagram showing another embodiment of the present invention.

FIG. 2 shows an FSK signal receiver demodulation circuit as one embodiment of this invention. In FIG. 2, an FSK signal is applied to an input terminal 1 and then to a frequency converter 2. The output of the frequency converter 2 is coupled to the input of an intermediate-frequency (IF) amplifier 4 of which output is coupled to a frequency discriminator 4. The output of the frequency discriminator 4 is applied to a comparator (shaping circuit or "1", "0" decision circuit) 6 through a low-pass filter 5, and also applied to the input of a voltage controlled oscillator 10 through a low-pass filter 8 and a subtracter 9. The output of the comparator 6 is connected to a demodulated signal output terminal 7 and to the input of a low-pass filter 11 of which output is applied to the other input of the subtracter 9. The output of the voltage controlled oscillator 10 is connected to the other input of the frequency converter 2. An automatic frequency control (AFC) system is constructed by a loop comprising the frequency converter 2, the IF amplifier 3, the frequency discriminator 4, the low-pass filter 8, the subtracter 9 and the voltage controlled oscillator 10. In this loop, the subtracter 9 acts to eliminate varying DC components.

Figure 3:
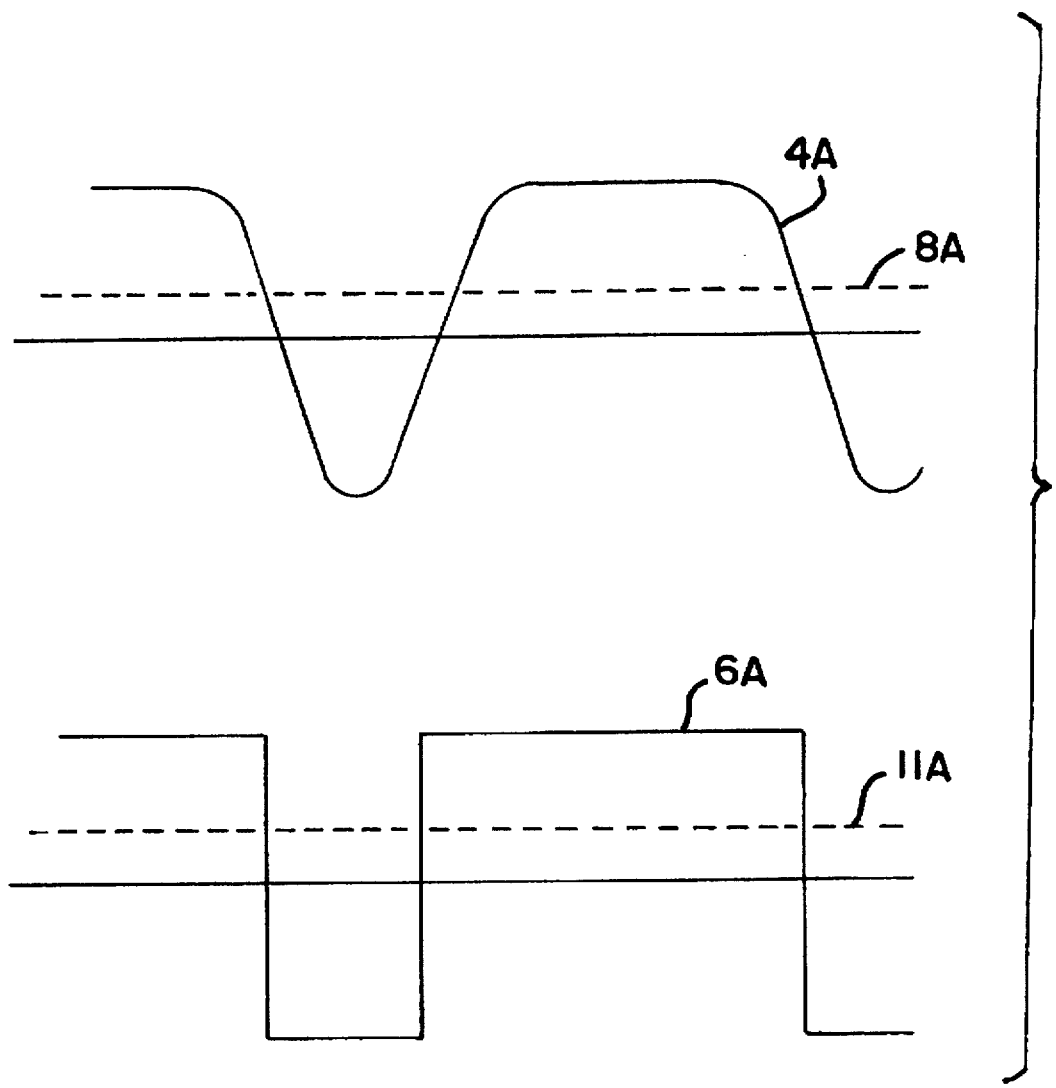
FIG. 3 shows waveform diagrams used to explain the operation of the circuit in FIGS. 1 and 2.

FIG. 3 shows an output waveform 4A of the frequency discriminator 4 and an output waveform 6A of the comparator 6, when the voltage controlled oscillator 10 provides the correct frequency without an influence by the DC components. Even if the amplitude of the output from the frequency discriminator 4 is produced balanced toward the positive and negative with respect to the zero reference level, in this case a DC component as shown by a dotted line 8A corresponding to a moving average value is produced on the output of the low-pass filter 8. Therefore, if no measures are taken thereagainst, the automatic control system so operates that this DC component becomes zero generally. Accordingly, although this DC component varies complicatedly depending on the contents of the codes, it follows that the automatic control system varies correspondingly.

The variation of this automatic control system can be eliminated by removing from the loop the DC components which vary depending on the contents of the codes. This is attained by low-pass filtering the output (6A in FIG. 3) of the comparator 6 by the low-pass filter 11 which has the same characteristics as those of the low-pass filter 8 to detect a DC component 11A as shown in FIG. 3, and by canceling the DC component 8A produced at the output of the low-pass filter 8 in the subtracter 9 by using the detected DC component 11A. Therefore, the voltage controlled oscillator 10 is stabilized with it generating the correct frequency.

Now, with the DC component based on the codes being canceled in the subtracter 9 and the voltage controlled oscillator 10 being stabilized at the correct frequency, the DC voltage (SA in FIG. 3) corresponding to the moving average value depending to the contents of the codes is generated at the output of the low-pass filter 8, since the output of the frequency discriminator 4 produces the correct baseband signal of which positive and negative voltages are balanced. This DC voltage is determined by the contents of the codes and the transfer function of the low-pass filter 8. Further, although the shaped output (6A in FIG. 3) signal of the baseband signal includes considerably high-frequency components in comparison with the output signal (4A in FIG. 3) of the frequency discriminator 4, since these high-frequency components are sufficiently suppressed by the low-pass filter 11, if the low-pass filter 11 is so constructed that it is the same as the low-pass filter 8 or has the same transfer function as that of the low-pass filter 8, both the low-pass filters 8 and 11 can provide the equal output when any kinds of code sequences are applied to the system. Therefore, the DC component which varies based on the contents of the codes can be canceled in the subtracter 9 by subtracting the output of the low-pass filter 11 from the output of the low-pass filter 8. It should be appreciated that the above-mentioned AFC loop can also eliminate any frequency error.

Figure 4:
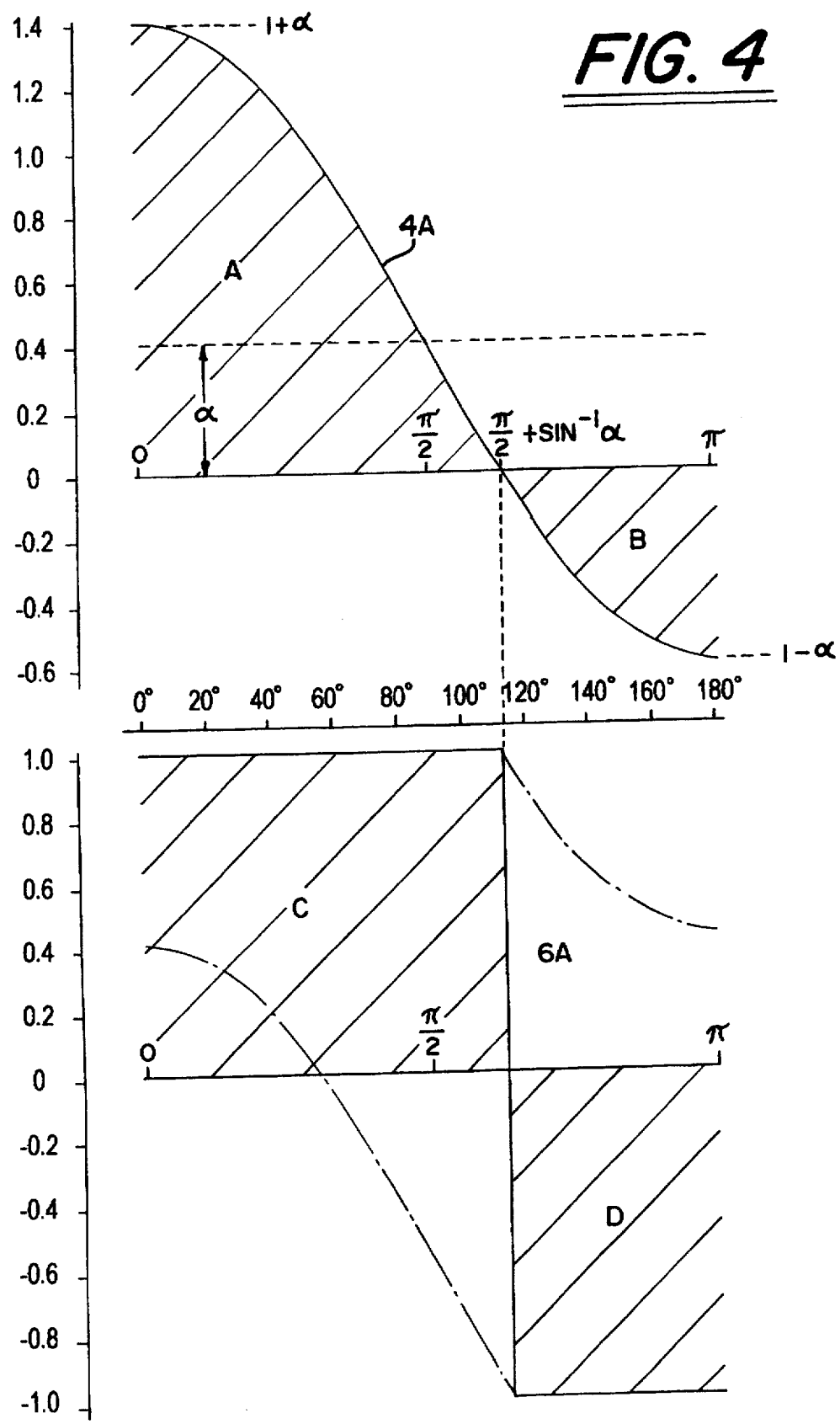
FIG. 4 shows waveform diagrams used to explain the operation of the circuit in FIG. 2.

Next, a case where a code sequence such as "101010 ...." "which includes no DC component and which may used as a bit synchronization signal is applied and where a signal with a frequency error is received is explained. In this case, since the code sequence is in the form of a repetitive signal, only a half period thereof is representatively taken account of. It is assumed that the signal is a correct cosine waveform by the fact that it has been sufficiently bandpass limited, and the signal amplitude is 1 and a frequency error equivalent is α, as shown in FIG. 4. At that time, the zero-cross point of the cosine waveform is expressed by $\pi/2 + \sin^{-1}\alpha$.

The output of the low-pass filter 8 is proportional to the difference between area A and area B, and the output of the low-pass filter 11 is proportional to the difference between area C and area D. Although detailed calculus is omitted because it is a thing of little account for this invention, areas A, B, C and D, and (area A 31 area B) and (area C - area D) can be expressed as follows:

$$ariaA = \alpha\left(\frac{\pi}{2} + \sin^{-1}\alpha\right) + \cos(\sin^{-1}\alpha)$$

-continued $$ariaB = -\alpha\left(\frac{\pi}{2} - \sin^{-1}\alpha\right) + \cos(\sin^{-1}\alpha)$$

$$ariaA - ariaB = \alpha\pi$$

$$ariaC = \frac{\pi}{2} + \sin^{-1}\alpha$$

$$ariaD = \frac{\pi}{2} - \sin^{-1}\alpha$$

$$ariaC - ariaD = 2\sin^{-1}\alpha$$

Therefore, the output of the subtracter 9 is a voltage level which is proportional to (area A = area B) – (area C = area D), that is ti $\alpha\pi - 2\sin-1\ \alpha$ Since in the above expression it is not clear which term is greater, power series expression is used for the fight term, that is $$2\sin^{-1}\alpha = 2\alpha + \frac{\alpha^3}{3} + \frac{3\alpha^3}{20} + \frac{15\alpha^7}{168} + \cdots$$

This expression may be summarized as follows:

2 $\sin^{-1}\alpha = 2\alpha$

Therefore, it is clear that $\alpha\pi > 2\alpha$. This means that the frequency control is maintained correctly.

Figure 1:
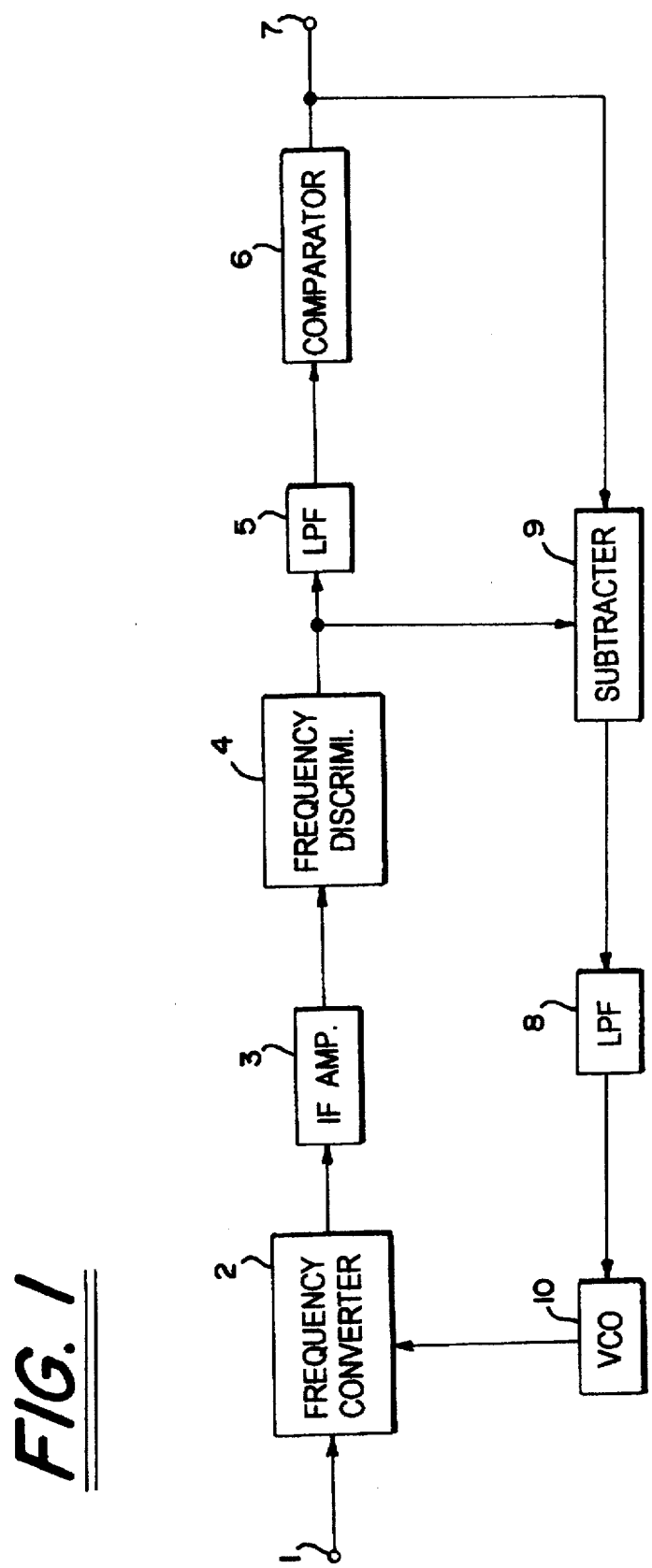
FIG. 1 is a circuit block diagram showing one embodiment of the invention.

A circuit shown in FIG. 1 is improved on the point of simplification. The same reference numerals are applied to the same circuit elements in the Figures. As is clear from the comparison of the circuit in FIG. 1 with the circuit in FIG. 2, the low-pass filter 11 is omitted in the circuit in FIG. 1, and after the subtraction operation of the outputs from the frequency discriminator 4 and the comparator 6 was carried out in the subtracter 9, the output of the subtracter 9 is low-pass filtered in the low-pass filter 8 and then applied to the voltage controlled oscillator 10.

Grounds by which one (low-pass filter 11) of two low-pass filters in the circuit in FIG. 2 can be omitted are as follows. In the circuit in FIG. 2, since the transfer functions of the low-pass filters 8 and 11 are the same and these low-pass filters and the subtracter 9 are linear systems, the output signal of the subtracter 9 is expressed below:

$$H_{1(p)}G_{0(p)} - H_{2(p)}G_{0(p)} = \{H_{1(p)} - H_{2(p)}\}G_{0(p)}$$

In this expression, $H_{1(p)}$ is Laplas transformation of the input signal waveform to the low-pass filter 8, $H_{2(p)}$ is Laplas transformation of the input signal waveform to the low-pass filter 11, $G_{O(p)}$ is transfer function of these low-pass filters and p is La place operator. In case where the transfer functions of the low-pass filters 8 and 11 are the same, if the low-pass filters and the order of calculations are reversed, the operations are quite the same, and therefore one of the low-pass filters can be omitted. Dashed lines as shown in FIG. 4 identifies the output of the subtracter 9. Since from these lines it can be guessed that the average value in this case is positive, it can be understood that the frequency error is detected correctly.

As is clear from the above explanation, the automatic frequency control in the stationary state can be made stably. However, in the circuit shown in FIG. 1, if there is an offset in the input to the comparator 6 or within the comparator 6, per se., the output of the comparator 6 may have been fixed to "0" or "1" before the signal was received. By this fact, it is possible that the voltage controlled oscillator 10 has been controlled in the high or low direction. The circuit shown in FIG. 5 can cope with this in actuality.

Figure 5:
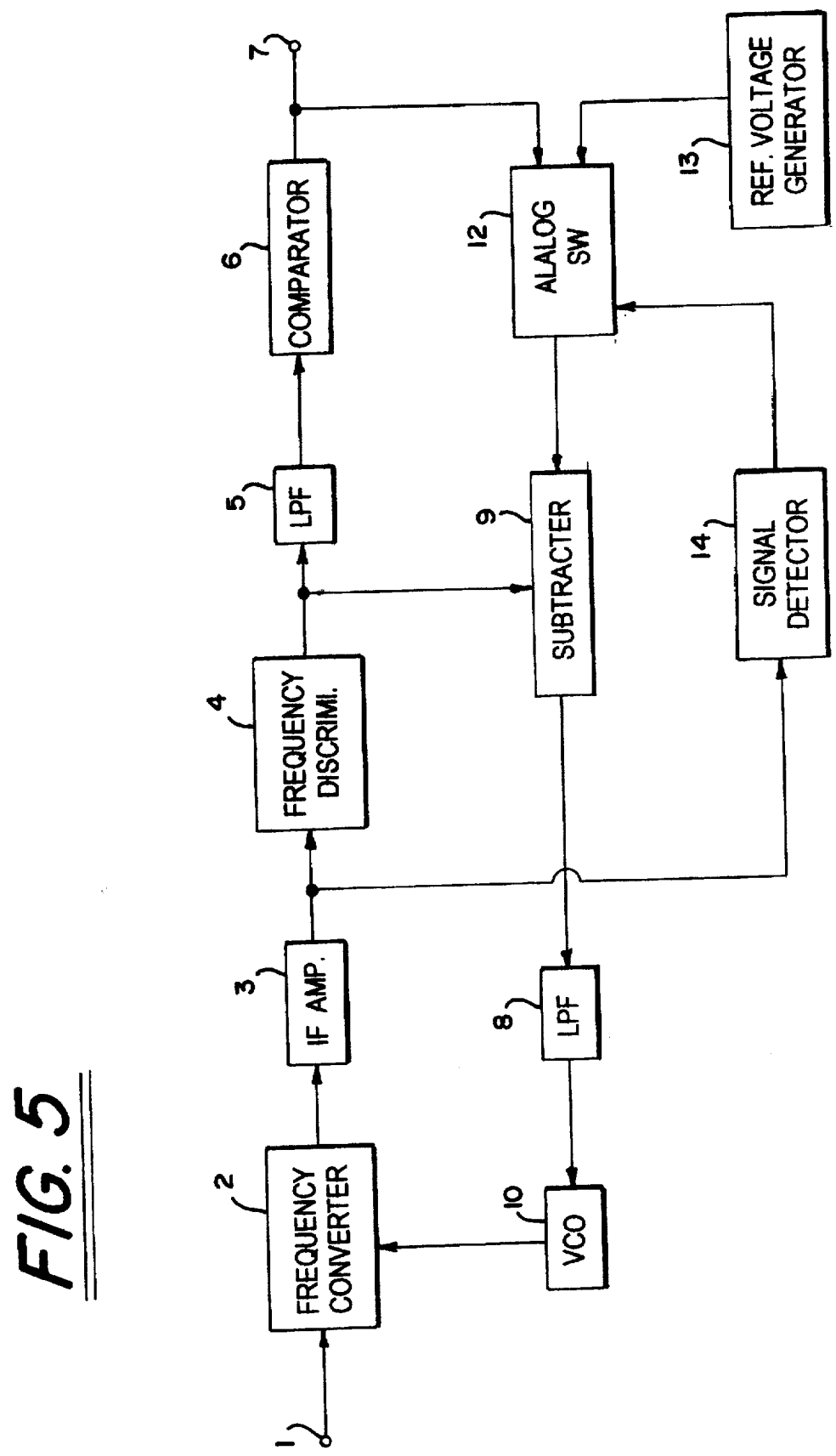
FIG. 5 is a circuit block diagram showing another embodiment of the present invention.

In FIG. 5, an analog switch 12, a signal detector 14 and a reference voltage generator 13 are added to the circuit shown in FIG. 1. The signal detector 14 receiving the output signal from the IF amplifier 3 controls the analog switch 12 so that it applies a reference voltage from reference voltage generator 13 to the subtracter 9 until the signal from the IF amplifier 3 is received, and after it was received the output signal from the comparator 6 to the subtracter 9. The reference voltage from the generator 13 may be the middle between "1" and "0" of the comparator output. Therefore, with the circuit shown in FIG. 5, the possibility of the fact that before the signal is received the voltage controlled oscillator 10 has been controlled in the high or low direction by the presence of an offset in the input to the comparator 6 and/or the generation of an offset within the comparator 6 can be avoided.

In a case where S/N of the received signal is satisfactory, since pass band widths of the IF amplifier and frequency discriminator can be made wider a little than the necessary band width, it is possible to carry out the correcting operation with the demodulated output alone. A circuit shown in FIG. 6 is an example to which this method is applied.

Figure 6:
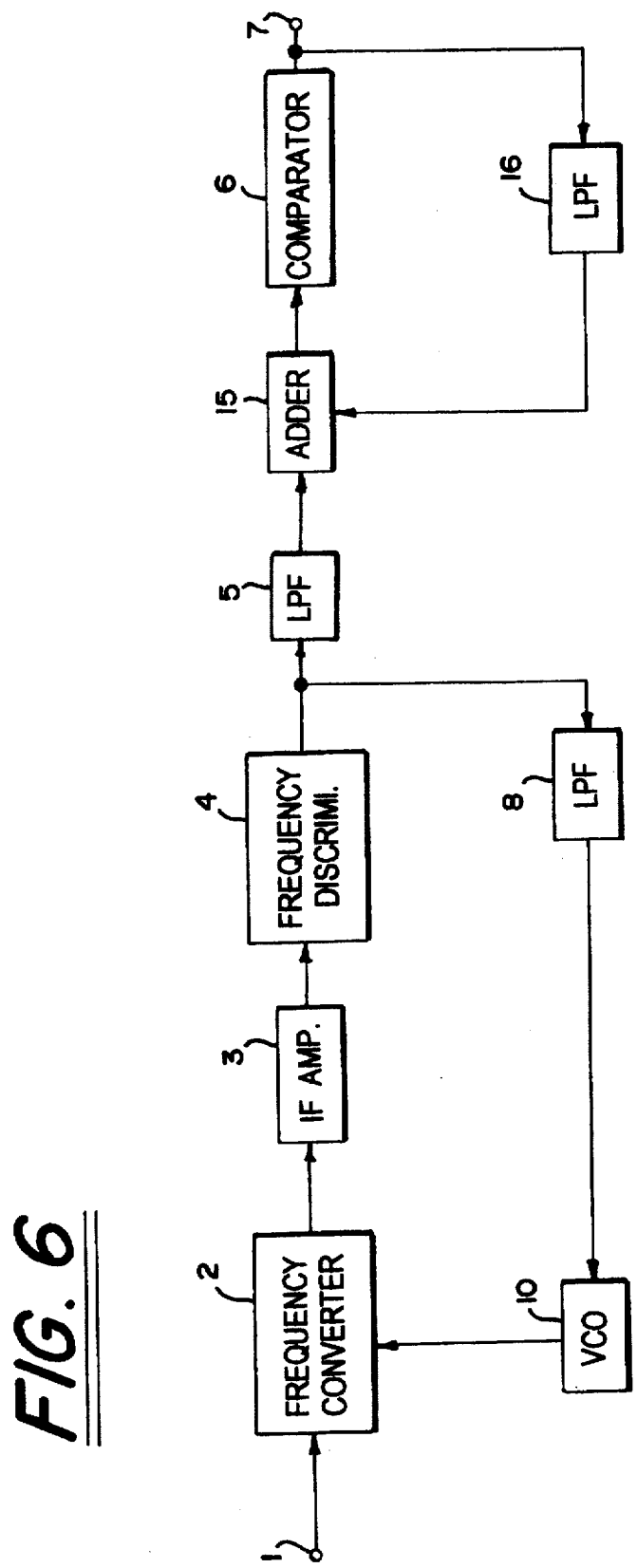
FIG. 6 is a circuit block diagram showing yet another embodiment of the present invention.

In FIG. 6, the same reference numerals are applied to the same circuit elements as those used in the previously mentioned embodiments. Particularly, the circuit in FIG. 6 has an adder for receiving at one input the output of the low-pass filter 5 and a low-pass filter 16 for receiving the output of the comparator 6 and providing an output to the other input of the adder 15. The low-pass filter 8 receiving the output signal from the frequency discriminator 4 and the voltage controlled oscillator 10 of which output frequency supplied to the frequency converter 2 is controlled by the output of the low-pass filter 8 constitute the AFC loop.

Transfer function $G_{1(p)}$ from the input terminal 1 to the output of the frequency discriminator 4 is express as follows:

$$G_{1(p)} = \frac{K_1(p + \omega_1)}{p + \omega_1(1 + K_1 K_2)}$$

In this expression, $K_1$ is detection sensitivity (V/Hz of the frequency discriminator 4, $K_2$ is control sensitivity (Hz/V) of the voltage controlled oscillator 10, $\omega_{1(p+\omega_1)}$ is transfer function of the low-pass filter 8.

In general, the low-pass filter 5 has a cut-off at a frequency sufficiently higher than the response frequency region of the control system, and therefore with no influence of this filter, if transfer function from the input terminal 1 to the output of the adder 15 is made $K_1$, that is the detection sensitivity of the frequency discriminator 4, in order that the amplitude-frequency characteristics for the transmission of the modulation signal is made flat, transfer function of the low-pass filter 16 is conveniently selected to $K_{1-G1}$ (p). That is, when the transfer function of the low-pass filter 16 is determined as follows, the variation of the automatic control system which depends on the DC components of the modulation codes is canceled at the output of the adder 15.

$$K_1 - G_{1(p)} = \frac{K_1(\omega_1 K_1 K_2)}{p + \omega_1(1 + K_1 K_2)}$$

The comparator 6 is actually constructed by a slicer which compares the input signal with a reference voltage and provides a comparison result, and usually it includes at its input portion a subtracter. Therefore, when the subtraction operation of the subtracter within the comparator 6 is utilized, the adder 15 may be omitted. In this case, a special consideration is needed by which the relationship in polarity between the input and output of the comparator 6 should be set inversely.

Also, in the circuit in FIG. 6, the analog switch 12 shown in FIG. 5 may be coupled between the comparator 6 and the low-pass filter 16. The reference voltage generator 13 and the signal detector 14 are also incorporated to the circuit in FIG. 6 in the same manner as described above in connection with FIG. 5.

Having described a preferred embodiment of the present invention, it should be evident that other embodiments are possible in the description set forth herein. Accordingly the claims provided below define the invention.

What is claimed is:

1. An automatic frequency control circuit for correcting a frequency error at the demodulation input of an FSK receiver including a frequency converter and a frequency discriminator, said circuit comprising:

a subtractor for subtracting from the output signal of said frequency discriminator and a shaped output signal of the demodulated signal from said frequency discriminator;

filtering means receiving the subtracted signal from said subtractor, said filtering means providing a frequency error signal which is unrelated to a frequency modulation component of modulation codes of the FSK signal; and a voltage controlled oscillator of which output frequency supplied to said frequency converter is controlled by said frequency error signal.

2. An automatic frequency control circuit as defined in claim 1, further including an IF amplifier which receives an output signal from said frequency converter; a signal detector which receives an output signal from said IF amplifier; a reference voltage generator for supplying a reference voltage; and an analog switch for receiving said reference voltage from said reference voltage generator, said shaped output signal of the demodulated signal from said frequency discriminator and an output signal from said signal detector, said signal detector controlling said analog switch so that said analog switch applies said reference voltage to said subtracter until said signal detector receives an output signal from said IF amplifier and thereafter applies said shaped output signal to said subtracter.

* * * * *

UNITED STATES PATENT AND TRADEMARK OFFICE
CERTIFICATE OF CORRECTION

PATENT NO. : 5,717,721
DATED : February 10, 1998
INVENTOR(S) : Kazuo Kawai

It is certified that error appears in the above-indentified patent and that said Letters Patent is hereby corrected as shown below:

Item [57] Title page, ABSTRACT

Lines 4 and 5 "substracting circuit followed to a loop filter" should be deleted Column 3, Line 62 "(area A 31 area B)" should be -- (area A - area B) --

Column 4, Line 16 " ti $\alpha\pi - 2\sin^{-1}\alpha$ " should be -- $\alpha\pi - 2\sin^{-1}\alpha$ --

Column 4, Line 19 "fight" should be -- right --

Signed and Sealed this

Twenty-fifth Day of August, 1998

Attest:

BRUCE LEHMAN

*Attesting Officer*    *Commissioner of Patents and Trademarks*